Patented July 29, 1924.

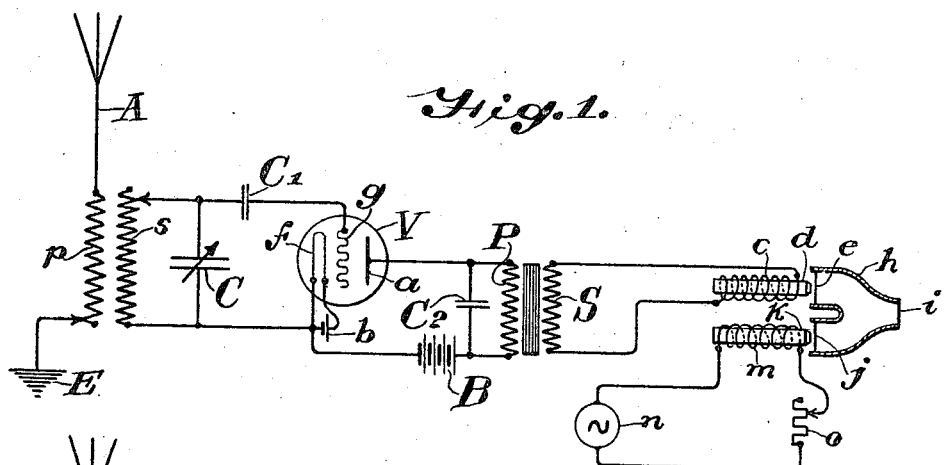
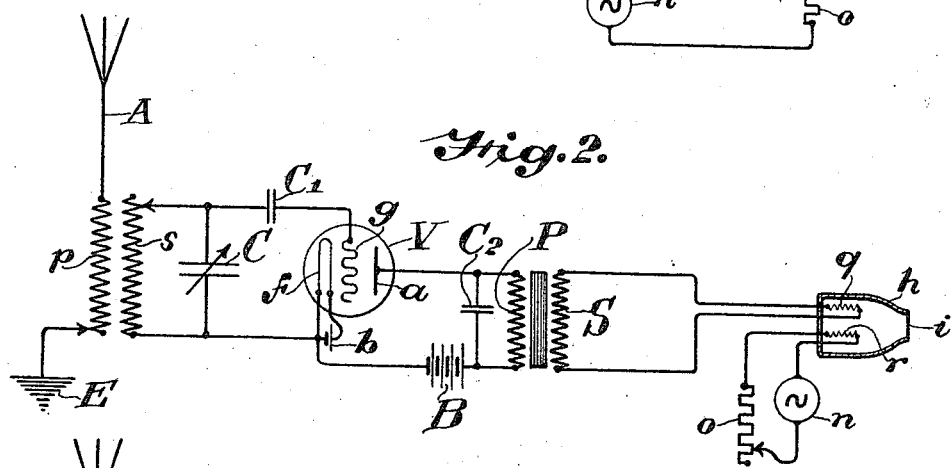
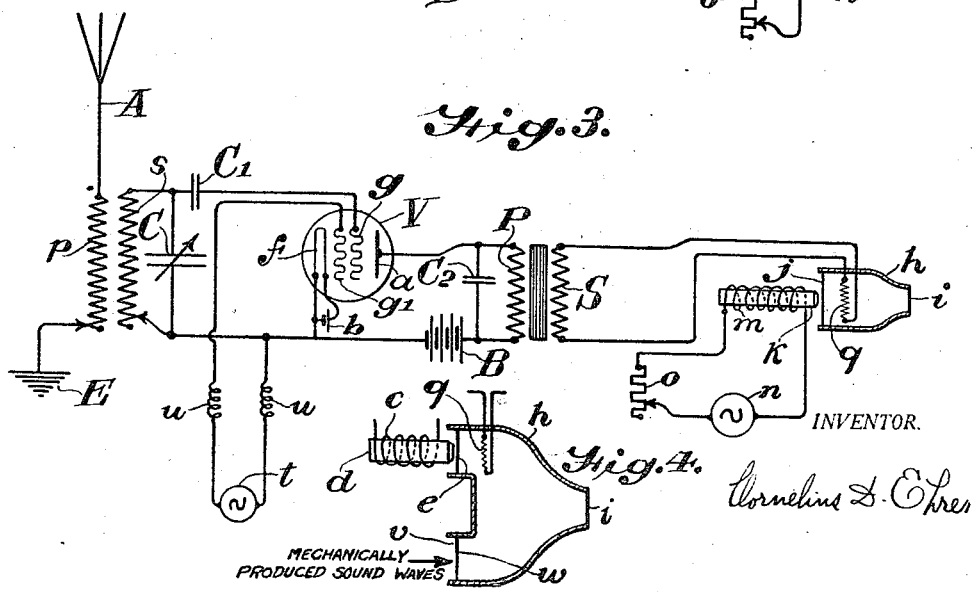

1,503,308

UNITED STATES PATENT OFFICE.

CORNELIUS D. EHRET, OF PHILADELPHIA, PENNSYLVANIA.

METHOD OF AND APPARATUS FOR ELECTRICALLY TRANSMITTING INTELLIGENCE.

Application filed October 22, 1920. Serial No. 418,678.

*To all whom it may concern:*

Be it known that I, CORNELIUS D. EHRET, a citizen of the United States, residing in the city and county of Philadelphia, State of Pennsylvania, have invented a new and useful Method of and Apparatus for Electrically Transmitting Intelligence, of which the following is a specification.

My invention relates to the electrical transmission of high frequency electrical energy, either through the natural media or over a line wire or wires connecting separated stations, for transmitting signals or messages, or for other purposes.
In accordance with my invention, the transmitted energy, representing the signal or message, may be in the form of high or radio frequency waves occurring in separated groups or trains, or in the form of sustained or non-decadent oscillations or waves, or in the form of sustained or non-decadent oscillations or waves whose amplitude varies periodically at a frequency lower than the high or radio frequency, such frequency of amplitude variation generally being substantially inaudible or above audibility.

At the receiving station the received high or radio frequency energy when in the form of wave trains or groups or of sustained waves varying periodically in amplitude is rectified or converted, and also amplified if desired, into lower frequency electrical undulations whose frequency corresponds with the wave train or group frequency of the received energy or with the frequency of amplitude variation of the sustained oscillations or waves; or when the received energy is in the form of sustained waves or oscillations not so varying in amplitude periodically at definite frequency, is at the receiving station caused to vary in amplitude periodically at predetermined frequency, which frequency is preferably substantially inaudible or above audibility, such received energy so varying periodically in amplitude being converted into current undulations of frequency corresponding with the frequency of amplitude variation.
In all cases the radio frequency has disappeared, and the current undulations produce in gas, as air, hydrogen, etc., or in liquid, as water, etc., sound waves which are of inaudible or substantially inaudible frequency.

With such sound waves are caused to interfere sound waves, preferably in the same medium, of different inaudible or substantially inaudible frequency, whereby sound wave beats of audible frequency are produced.

In accordance with my invention, therefore, beats are produced and occur in a sound transmitting medium, and where the interfering sound waves are produced electrically, there is no interference of the different electrical currents to produce electrical beats; that is to say, in accordance with my invention the reception is independent of electrical beats.

My invention resides in the method and apparatus hereinafter described and claimed.

For an understanding of my method and for an illustration of some of the forms my apparatus may take, reference is to be had to the accompanying drawing, in which:

Fig. 1 is a diagrammatic view of one form of receiving apparatus for practicing my method and embodying my invention.

Fig. 2 is a diagrammatic view of modified form of receiving apparatus.

Fig. 3 is a diagrammatic view of a further modification of receiving apparatus.

Fig. 4 is an illustration of a modified form of part of the receiving apparatus.

Referring to Fig. 1, there is illustrated a receiving apparatus utilizable in connection with transmitting apparatus which transmits high or radio frequency energy either in the form of groups or separated decadent wave trains or in the form of sustained high frequency energy varying in amplitude at predetermined frequency.

For example, the transmitted energy may be in the form of wave trains or groups succeeding each other at the rate of say 20,000 per second; or the transmitted energy may be in the form of sustained high or radio frequency waves varying periodically in amplitude at a frequency of 20,000 per second.

In either case the received energy, whether transmitted as radiant energy or as oscillations of a conducting system extending between stations, is present in the receiving antenna or conductor A between which and earth, counter-capacity or return conductor E may be connected the adjustable primary $p$ of an oscillation transformer inductively related to its variable secondary s which, with the variable condenser C, may form a circuit attuned to the high or radio frequency of the received energy. Associated with the secondary circuit is any suitable integrating, rectifying or amplifying detector, as a so-called crystal detector, or as illustrated, a thermionic device or vacuum tube V, preferably operating as a rectifier, having the grid $g$, the filament $f$ incandesced by current from the battery $b$, and having also the plate or anode $a$. In the grid circuit may be included a grid condenser $C^1$. In the anode circuit is the source of energy or battery B and the primary P, which may be shunted by the condenser $C^2$, of a transformer (which may have a magnetizable core when the frequencies involved are sufficiently low), whose secondary S is connected to the winding $c$ surrounding the soft iron or permanent magnet core $d$ co-acting with a diaphragm $e$ which itself may be of magnetizable material, or which may be of non-magnetizable material carrying a magnetizable armature opposite the end of the core $c$. The structure $c$, $d$, $e$ is in effect a magneto telephone.

The received energy is acted upon by the thermionic device V in such wise that in the circuit of the primary P appears an amplified current having a component undulating at a frequency corresponding with the group or wave train frequency or the frequency of the amplitude variation of the received sustained oscillations or waves. In the secondary S appears only a current of such wave train or group frequency or of frequency corresponding with the frequency of variation of amplitude of sustained waves or oscillations, and there is in the circuit of the secondary S no effective high or radio frequency component.

The diaphragm $e$ accordingly is set into vibration with a frequency corresponding with the wave train or group frequency or with the frequency of amplitude variation or of the sustained wave trains or oscillations. The diaphragm $e$ therefore communicates vibrations of such frequency to the gas, as air, or liquid, as water, within the chamber $h$. When air is employed within the chamber $h$ the latter may be open to the outer atmosphere at $i$, to which the ear may be applied or with which may be connected any sound conducting means extending to the ear. When gas other than air, or when liquid is employed within the chamber $h$, there may be disposed at $i$ another diaphragm which is set into vibration by the sound waves within the gas or liquid, and such diaphragm then communicates the sound waves to the ear through the intervening air or through any other sound conducting means.

The sound waves produced in the medium within the chamber $h$ having a frequency of the order of 20,000 per second are inaudible or substantially so, and will accordingly produce no or substantially no effect upon the ear.

The chamber $h$ is provided with a further diaphragm $j$, which may be similar to the diaphragm $e$, and co-act with the core $k$ having the winding $m$, the structure $j$, $k$ and $m$ again constituting in effect a magneto telephone whose core $k$ may be either soft iron or a permanent magnet. The winding $m$ is connected in the circuit of a source $n$ of fluctuating or alternating current of inaudible or substantially inaudible frequency different from the frequency of the current in the winding $c$. The frequency of the current through the winding $m$ may be, for example, 21,000 per second, causing the diaphragm $j$ to vibrate at similar rate and produce within the medium within the chamber $h$ sound waves of like frequency, which, however, interfere with the sound waves of say, 20,000 per second frequency caused by the diaphragm $e$, with the result that there is produced in the medium within the chamber $h$ sound wave beats whose frequency is 1,000 per second, which is audible.

The sound waves produced within the chamber $h$ by the diaphragms $e$ and $j$ may have any suitable relative values; generally, the sound waves produced by the diaphragm $e$ will be weaker than those produced by the diaphragm $j$. In any event, the beat sound waves may be of equal or greater amplitude than the amplitude of the waves emitted by either diaphragm $e$ or $j$, and there is therefore an amplification effect. In order suitably to control the amplitude of the sound vibrations produced by the diaphragm $j$, there may be included in the circuit of the coil $m$ any suitable current controlling means as, for example, the adjustable resistance $o$, it being desirable that the interfering sound waves shall not have an amplitude either too great or too small, but of a magnitude of the same order as the magnitude of amplitude of the sound waves porduced or controlled by the received energy.

In Fig. 2, the arrangement is similar to that of Fig. 1, except that the chamber $h$, which may contain medium of the character described in connection with Fig. 1, contains a resistance $q$ of very fine wire, such as in a thermic telephone, connected in circuit with the secondary S. There is also within the chamber $h$ a second and similar resistance $r$ in circuit with the source $n$ and the variable resistance $o$.

In this case the action is similar to that described in Fig. 1 in that the resistances $q$ and $r$, due to their very small heat storage capacities or inertias, change greatly in temperature in synchronism with the currents traversing the same, whereby the resistance $q$ produces within the medium in the chamber $h$ sound waves of say, 20,000 vibrations per second, and resistance $r$ similarly produces sound waves of say, 21,000 vibrations per second, with the result that these sound waves, as before, interfere and produce sound wave beats of 1,000 vibrations per second.

In Fig. 3 is illustrated one of various arrangements which may be employed in the case where the transmitted energy is in the form of sustained oscillations or waves which do not vary in amplitude at predetermined frequency. The received energy is supplied to the audion or thermionic device V as before, but the current in the circuit of the anode $a$ and primary P is caused to have, by any suitable method or means, a component of relatively low frequency amplitude variation. For purposes of illustration merely, and without limitation of my invention thereto, such low period amplitude variation, as for example, at the rate of 20,000 per second, is effected by means of the source of alternating or fluctuating current $t$, whose one terminal is connected to the cathode or filament $f$ of the thermionic device, and whose other terminal connects with the second grid $g^1$, choke coils $u$, $u$ being connected in circuit to prevent flow therein of high or radio frequency current.

As before, therefore, in the secondary S there is a current without effective high or radio frequency component, but itself varying in amplitude at the rate of say, 20,000 per second. In circuit with the secondary S may be connected any suitable means for effecting in the chamber $h$ sound waves of like frequency. This may be, as in Fig. 2, a resistance $q$. There are provided also any suitable means for producing sound waves of different frequency, as 21,000 per second. This may be another resistance, as $r$, of Fig. 2, or as indicated, may be a diaphragm $j$ forming with the coil $m$ and core $k$, as in Fig. 1, a magneto telephone device in circuit with the source $n$, of 21,000 cycles per second, and the variable resistance $o$. Here again sound wave beats are produced at the rate of 1,000 per second.

While in the above described method and apparatus the interfering sound waves are electrically produced, there is no interaction between the different electric currents to produce electrical beats; and in no case is there produced a current of high or radio frequency reacting with the received high or radio frequency waves or oscillations to produce electrical beats.

In lieu of electrically producing the interfering sound waves, they may be produced by any other suitable method or means. For example, they may be produced mechanically by a vibrating string, rod, plate, flue pipe, reed pipe, or the like, the sound waves being communicated in any suitable way to the interior of the chamber $h$, Fig. 4, either directly through the opening or passage $v$ or through the intermediate diaphragm $w$, if employed. The sound waves delivered into the passage $v$, with or without the presence of the diaphragm $w$, may be produced also by the well known siren which involves relatively rotating disks, or equivalent, having holes adjacent their peripheries through which air is forced or passed, the intermittance of the air flow setting up sound waves of any desired frequency, in this instance of inaudible or substantially inaudible frequency.

With the sound waves so mechanically produced and impressed upon the medium within the chamber $h$, Fig. 4, will interfere sound waves produced by the diaphragm $e$, as above described, or by the resistance $q$, as above described, or both, or by any equivalent means, the result being again a sound wave beat of audible frequency. The amplitude of the sound waves mechanically produced is made suitably small, as for example, of the same order as the amplitude of the sound waves produced by diaphragm $e$, resistance $q$, or equivalent.

What I claim is:

1. The method which consists in converting alternating current energy into an electric current vibrating at lower frequency, producing sound waves in a quiescent sound transmitting medium under control of said current of lower frequency, and impressing on said medium independently produced sound waves of different frequency interfering with said first named sound waves to produce in said medium sound wave beats.

2. The method which consists in converting high or radio frequency energy into current vibrating at lower frequency without high or radio frequency component, controlling the production of sound waves in a quiescent sound transmitting medium by said lower frequency current, and independently impressing on said medium sound waves of different frequency interfering with said first named sound waves to produce in said medium sound wave beats.

3. The method which consists in converting high or radio frequency energy into current vibrating at lower frequency without high or radio frequency component, controlling the production of sound waves in a quiescent sound transmitting medium by said lower frequency current, and independently impressing on said medium sound waves of different frequency interfering with said first named sound waves to produce in said medium sound wave beats of audible frequency.

4. The method of electrically transmitting intelligence, which consists in producing high or radio frequency waves or oscillations representing the intelligence to be transmitted, and periodically varying in amplitude at predetermined lower frequency, receiving such energy and converting it into a vibrating electric current of frequency corresponding with said frequency of amplitude variation, controlling the production of sound waves thereby, and independently producing sound waves of different frequency interfering with said first named sound waves to produce beats.

5. The method of electrically transmitting intelligence, which consists in producing high or radio frequency waves or oscillations representing the intelligence to be transmitted, and periodically varying in amplitude at predetermined lower inaudible or substantially inaudible frequency, receiving such energy and converting it into a vibrating electric current of frequency corresponding with said frequency of amplitude variation, controlling the production of sound waves thereby, and independently producing sound waves of different frequency interfering with said first named sound waves to produce audible beats.

6. The method which consists in converting alternating current energy into an electric current vibrating at lower frequency, producing sound waves by said current of lower frequency and independently electrically producing sound waves of different frequency interfering with said first named sound waves to produce sound wave beats.

7. The method which consists in converting high or radio frequency energy into current vibrating at lower frequency without high or radio frequency component, controlling the production of sound waves by said lower frequency current, and independently electrically producing sound waves of different frequency interfering with said first named sound waves to produce sound wave beats.

8. The method which consists in converting high or radio frequency energy into current vibrating at lower frequency without high or radio frequency component, controlling the production of sound waves by said lower frequency current, and independently electrically producing sound waves of different frequency interfering with said first named sound waves to produce sound wave beats of audible frequency.

9. Receiving apparatus comprising means for converting high or radio frequency energy into current of lower frequency, a quiescent sound transmitting medium, means controlled by said current of lower frequency for impressing sound waves upon said medium, and independent means for impressing upon said medium sound waves interfering with said first named sound waves to produce beats in said medium.

10. Apparatus for receiving high or radio frequency energy varying in amplitude at lower frequency comprising means controlled by the received energy for producing a current whose frequency corresponds with said lower frequency, means controlled by said current of lower frequency for producing sound waves, and independent means for producing sound waves of different frequency interfering with said first named sound waves to produce beats.

11. Apparatus for receiving high or radio frequency energy varying in amplitude at lower inaudible frequency comprising means controlled by the received energy for producing a current whose frequency corresponds with said lower inaudible frequency, means controlled by said current of lower frequency for producing sound waves, and independent means for producing sound waves of different inaudible frequency interfering with said first named sound waves to produce audible beats.

12. Receiving apparatus comprising means for converting high or radio frequency energy into current of lower frequency, means controlled by said current of lower frequency for producing sound waves, and independent means for electrically producing sound waves interfering with said first named sound waves to produce beats.

13. Apparatus for receiving high or radio frequency energy varying in amplitude at lower frequency comprising means controlled by the received energy for producing a current whose frequency corresponds with said lower frequency, means controlled by said current of lower frequency for producing sound waves, and independent means for electrically producing sound waves of different frequency interfering with said first named sound waves to produce beats.

14. Apparatus for receiving high or radio frequency energy varying in amplitude at lower inaudible frequency comprising means controlled by the received energy for producing a current whose frequency corresponds with said lower inaudible frequency, means controlled by said current of lower frequency for producing sound waves, and independent means for electrically producing sound waves of different inaudible frequency interfering with said first named sound waves to produce audible beats.

15. Receiving apparatus comprising a chamber containing a quiescent sound transmitting medium, means for producing in said medium sound waves under the control of received energy, and a local source for producing in said medium independently of received energy sound waves of different frequency interfering with said first named sound waves to produce beats.

16. Receiving apparatus comprising a high frequency wave receiving system, a detector therein for effecting current variations of a frequency different from the frequency of the transmitted waves, a quiescent sound transmitting medium, means controlled by said detector for impressing upon said medium sound waves of a frequency dependent upon the frequency of variation of said current, and means for locally generating sound waves of different frequency and for impressing them upon said medium to interfere with said first named sound waves to produce audible sound wave beats in said medium.

17. Receiving apparatus comprising a chamber containing a fluid sound transmitting medium, a plurality of diaphragms in operative relation with said medium, means controlled by signal representing energy for actuating one of said diaphragms, and a local source of energy for vibrating another of said diaphragms for amplifying the effect produced by said first named diaphragm upon said medium.

18. Receiving apparatus comprising a chamber containing a fluid sound transmitting medium, means controlled by received signal representing energy for producing sound waves in said medium, a diaphragm in operative relation with said medium for producing sound waves therein, and a local source of energy for vibrating said diaphragm at a predetermined frequency.

19. Receiving apparatus comprising a chamber containing a fluid sound transmitting medium, means controlled by received signal representing energy for producing sound waves in said medium, a diaphragm in operative relation with said medium for producing sound waves therein, and a local source of energy for vibrating said diaphragm at a frequency different from the frequency of said first mentioned sound waves to effect sound wave beats in said medium.

In testimony whereof I have hereunto affixed my signature this 20th day of October, 1920.

CORNELIUS D. EHRET.